(12) United States Patent
Rancourt

(10) Patent No.: US 6,336,534 B1
(45) Date of Patent: Jan. 8, 2002

(54) FLEXIBLE BRAKE SHOE

(76) Inventor: Yvon Rancourt, 779 Boulevard Industriel, Blainville, Quebec (CA), J7C 3V3

( * ) Notice: Subject to any disclaimer, the term of this patent is extended or adjusted under 35 U.S.C. 154(b) by 0 days.

(21) Appl. No.: 09/678,092

(22) Filed: Oct. 4, 2000

(51) Int. Cl.[7] .............................................. F16D 69/00
(52) U.S. Cl. ...................................... 188/259; 188/249
(58) Field of Search .............................. 188/250 R, 249, 188/259, 251 A, 251 M, 250 B, 258, 26, 218 XL

(56) References Cited

U.S. PATENT DOCUMENTS 5,203,438 A * 4/1993 Ide ........................... 192/107 C

FOREIGN PATENT DOCUMENTS

WO WO 98/29671 7/1998

* cited by examiner

Primary Examiner—Christopher P. Schwartz
Assistant Examiner—C. T. Bartz

(74) Attorney, Agent, or Firm—Birch, Stewart, Kolasch & Birch, LLP

(57) ABSTRACT

A disk brake assembly has a housing mounted to a vehicle and a rotor disk mounted to a wheel of the vehicle. Upon expansion of an annular flexible bladder during a brake action, a first brake shoe moves towards the rotor disk and causes the rotor disk to move towards the second brake shoe resulting frictional engagement between the respective brake shoes and the rotor disk. The first brake shoe is deformable under uneven and variable forces resulting from imperfect machining and uneven wearing of the rotor disk. An annular brake pad is attached to first brake shoe using a layer of resilient and deformable material to improve the resilience of the first brake shoe. An annular piston member which protrudes from the first brake shoe to be compressed by the annular flexible bladder is thermally insulated and radially displaceable with respect to the first brake shoe so that the annular piston member is adapted to maintain the original radial position with respect to the annular bladder regardless of radial thermal expansion of the annular rotor disk. Thus, the improved disk brake assembly according to the invention minimizes the local high pressures and temperatures at protruding spots on frictional surfaces of the rotor and makes the brake pad lifetime longer. The improved disk brake assembly also reduces stresses of the bladder and avoids premature aging of the bladder.

26 Claims, 1 Drawing Sheet

FLEXIBLE BRAKE SHOE

FIELD OF THE INVENTION

The present invention relates to disk brakes and more particularly to improvements in a disk brake shoe used in larger area contact disk brakes for vehicles.

BACKGROUND OF THE INVENTION

The disk brake shoe of the present invention is used in disk brake assemblies of the type described in the Applicant's PCT application of PCT/CA97/01014, entitled IMPROVED DISK BRAKE ASSEMBLY and published as W098/29671 on Jul. 9, 1998. The disk brake assembly refers to full annular disk brakes proposed for automobiles and light trucks.

The full annular disk brake assembly described in this PCT application generally includes a housing mounted to a vehicle and a rotor disk mounted to a wheel of the vehicle. First and second annular brake shoes extend parallel to the rotor disk within the housing and are mounted thereto. The second brake shoe is movable axially by means of an oil applied bladder mounted to the housing. The oil applied bladder moves the second brake shoe axially against the rotor disk. When pressure is applied to the rotor disk by the second brake shoe and the bladder, the rotor disk is adapted to slide axially towards the first brake shoe so that the rotor disk frictionally engages the first and the second brake shoes.

It has been found that vibrations between the first and second brake shoes are the major cause of brake squeal. Under certain situations, vibrations may cause large displacements and severe stresses in the brake. The vibrations generally are produced by the frictional forces between the brake shoes and the rotor disk, especially when the frictional surfaces of the rotor disk are imperfectly machined or unevenly worn.

In order to reduce the vibration in the disk brake assembly elastic rolling seals are provided between the axially slidable rotor disk and the hub adapter, and between the second slidable brake shoe and its support structure. For further improving vibrations, an improved housing is described in the Applicant's co-pending Canadian patent application 2,314,547 which is entitled DISK BRAKE HOUSING and filed on Jul. 25,2000. The housing includes an annular radial wall having an annular ridge on the inner surface to abut the brake shoe which is supported by the housing so that during a brake action uneven and variable forces applied to the brake shoe will cause local portions of the brake shoe to oscillate about the contact point. The oscillation will be dampened by damping pads placed between the housing and the brake shoe. The improvement made in the above two patent applications greatly reduce the vibration caused by uneven and variable forces during brake actions. However, there is still a need for additional improvements to further reduce the vibrations.

Imperfect machining or uneven wearing of the frictional surfaces of the rotor disk not only produce vibrations but also cause other problems. Protruding spots on the frictional surfaces of the rotor disk, resulting from either imperfect machining or uneven wearing, will be pressed to the brake shoes with much greater pressure when the rotor disk is frictionally engaged with the brake shoes during the brake action, which results in local high temperatures at those protruding spots to make those protruding spots crystallize. The crystallized protruding spots are very hard and make the brake shoes wear out rapidly.

Furthermore, the frictional movement between the rotor disk and the brake shoes produces a great amount of heat which causes thermal expansion of the brake shoes. The second brake shoe has an annular piston member protruding axially from the brake shoe, to be pressed by the flexible annular bladder so that when pressurized fluid is pumped into the bladder, the bladder is expanded and presses the brake shoe to move axially towards the rotor disk. The annular piston member has a diameter substantially equal to the diameter of the annular bladder. However, because of the thermal expansion of the brake shoe, the diameter of the annular piston member will increase and the annular piston member is not adapted to maintain its original radial position with respect the annular bladder. The radially displaced annular piston member forces a radial displacement of the flexible annular bladder when the annular piston member is compressed by the annular bladder, resulting in additional stresses in the flexible material of the bladder, and eventually causing premature aging of the flexible material, and finally inducing misfunction of the bladder. Therefore there is a need for further improvements to overcome the above problems.

SUMMARY OF THE INVENTION

It is an object of the present invention to provide a disk brake shoe, especially for a full annular disk brake for automobiles, that has an improved configuration to add a better reduction of vibrations.

It is another object of the present invention to provide a disk brake shoe having a longer lifetime.

It is yet another object of the present invention to provide a disk brake shoe adapted to keep a radial contact position with the flexible annular bladder regardless of the thermal expansion of the brake shoe.

It is a further object of the present invention to provide an improved disk brake assembly overcoming the shortcomings of the prior art disk brake assemblies.

Generally a disk brake assembly for a vehicle wheel on a vehicle includes a housing having an annular radial wall mounted to the vehicle, an annular rotor disk within the housing and co-axially mounted to the wheel, a brake shoe, and an annular expandable bladder attached to the annular radial wall of the housing, upon expansion of the bladder during a brake action, the brake shoe being adapted to move towards the rotor disk resulting in frictional engagement between the rotor disk and the brake shoe.

In accordance with one aspect of the present invention, the brake shoe comprises a radial section parallel to the rotor disk; means associated with the housing for radially supporting the brake shoe within the housing; means associated with the housing for preventing the brake shoe from rotation. The radial section is made from a resilient metal material and has a relative thin thickness whereby during the brake action the brake shoe is deformable under uneven and variable forces resulting from imperfect machining or uneven wearing of the rotor disk. The radial section of the brake shoe is deformed locally and instantly when it comes into contact with the protruding spots on a planar frictional surface of the rotor disk so that the high pressure between the rotor disk and the brake shoe applied by those protruding spots are minimized and the crystallization of those protruding spots is avoided. As a result, the rapid wearing-out of the brake shoe or brake pad attached to the brake shoe is prevented.

The brake shoe preferably comprises an annular brake pad for frictional engagement with the rotor disk, and a layer of resilient and deformable material disposed between the annular brake pad and a radial annular surface of the annular radial section of the brake shoe to secure the annular brake pad to the radial section. The layer of resilient and deformable material is also adapted to be instantly and locally deformed in a manner similar to the radial section of the brake shoe when the brake pad comes into contact with the protruding spots on the planar frictional surface of the rotor disk, to reduce the high pressure applied by those protruding spots during brake actions. The resilient properties provided by the layer of resilient and deformable material and the deformable radial section of the brake shoe not only reduce the high pressure between the rotor disk and the brake shoe to prevent the rapid wearing-out of the brake pad, but also help in absorption of vibration energies produced during brake actions to further reduce vibrations. Alternatively, the annular brake pad might be replaced by a plurality of brake pads circumferentially spaced apart for frictional engagement with the rotor disk. The layer of resilient and deformable material is disposed between the respective brake pads and the radial annular surface of the annular radial section of the brake shoe to secure the respective brake pads to the radial section.

In accordance with another aspect of the present invention, the brake shoe comprises a radial section having a radial planar surface parallel to the rotor disk; means associated with the housing for radially supporting the brake shoe within the housing; means associated with the housing for preventing the brake shoe from rotation; an annular piston member protruding axially from the annular radial section for being pressed by the annular expandable bladder; and a layer of resilient and deformable material disposed between the annular piston member and the radial section to secure the annular piston member to the radial section, permitting a relative radial displacement therebetween whereby the annular piston member is adapted to maintain an original radial position with respect to the annular expandable bladder regardless of radial thermal expansion of the annular rotor disk. The layer of resilient and deformable material disposed between the radial section of the brake shoe and the annular piston member is radially deformed when the brake shoe is thermally and radially expanded during brake actions while the annular piston member is held in the original radial position with respect to the annular flexible bladder, and as a result, radial displacement of the flexible bladder is avoided. The radial displacement of the flexible bladder, if it occurs might induce stresses and premature aging of the bladder, and eventually cause misfunction.

It is also important to prevent the heat energy produced from frictional movements during brake actions from transferring to the annular piston member because the annular piston member will thermally and radially expand itself when it is heated. Therefore, a thermal insulator is preferably disposed between the layer of resilient and deformable material and the annular piston member to inhibit heat transferring from the radial section of the brake shoe to the piston member. It is desirable that the piston member has a hollow structure defining an inner annular space within the annular piston member and a plurality of bores preferably extending therethrough to communicate with the inner annular space and the outside of the annular piston member so that air is enabled to enter and exit from the annular piston member to further ensure that the piston member is not improperly heated.

The improvements to the brake shoe according to the present invention are relatively simple but efficiently improve the performance of the disk brake assembly, preventing the premature wearing-out and misfunction of the disk brake assembly. Other advantages and features of the invention will be better understood with reference to a preferred embodiment of the invention described below.

BRIEF DESCRIPTION OF THE DRAWINGS

Having thus generally described the nature of the invention, the invention will now be described in detail with reference to the accompanying drawings in which.

DETAILED DESCRIPTION OF THE PREFERRED EMBODIMENT

Figure 1:
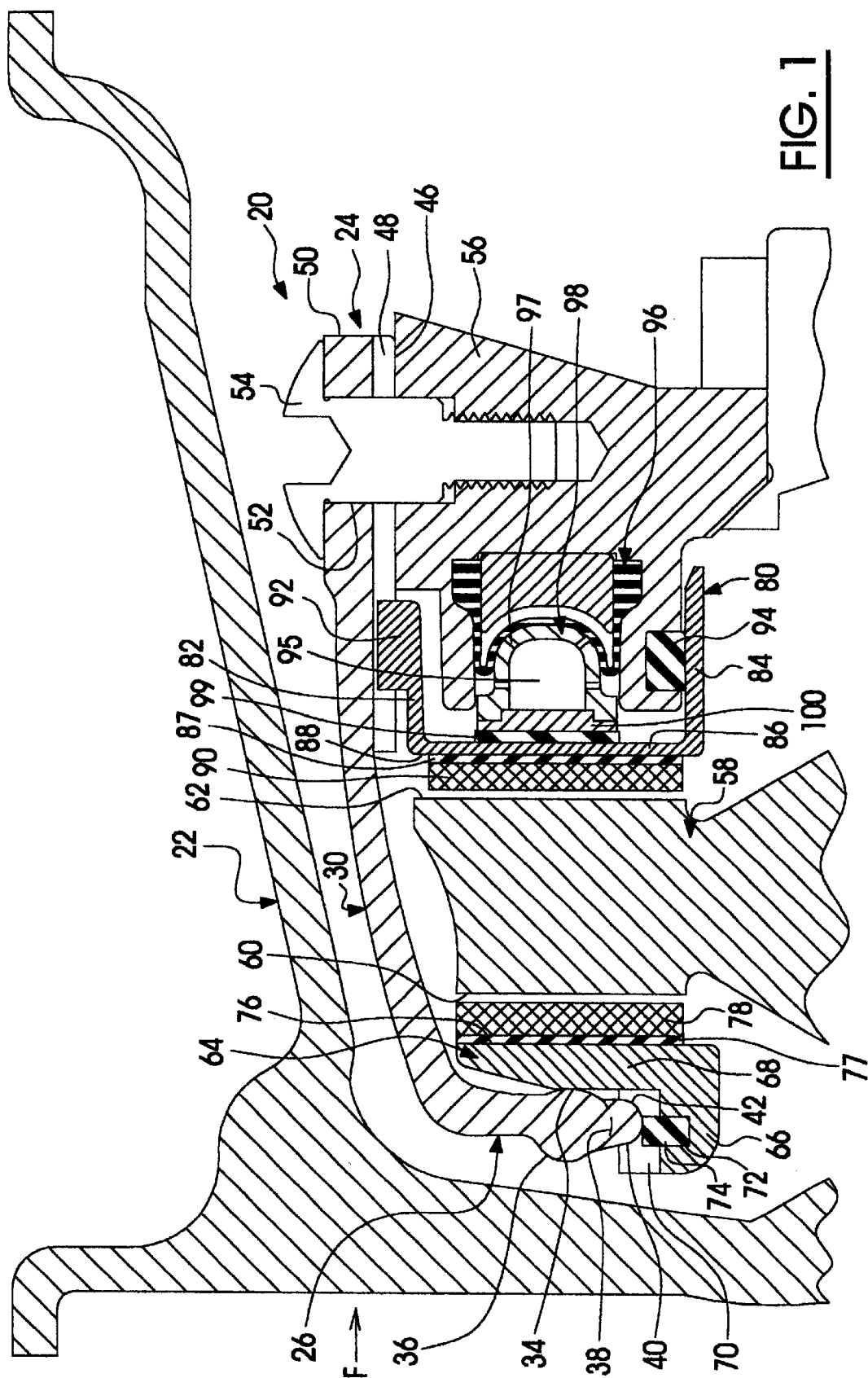
FIG. 1 is a partial, longitudinally cross-sectional view of a disk brake assembly preferred embodiment of the invention.

Referring now to the drawing, the disk brake assembly 20 for an automobile wheel 22 is illustrated having a housing 24. The housing 24 has an annular radial wall 26 and a plurality of link members 30 extending axially from the radial wall 26 and circumferentially spaced apart from one another (only one link member 30 shown).

An annular ridge 34 is raised from the inner surface of the annular radial wall 26 with a smoothly curved surface for abutting the annular brake shoe, which will be described in detail below. An annular portion 36 of the external surface of the annular radial wall 26, at the inner edge 38, is raised outwards with a smoothly curved surface for both aesthetic purposes and a functional purpose of strengthening the housing structure. A plurality of radial protruding members 40 (only one shown) are provided at the inner edge 38 of the annular radial wall 26, circumferentially spaced apart from one another (not shown). Each of the radially protruding members 40 has a smoothly curved end surface 42.

Each of the link members 30 includes an inner surface 46 having a groove 48 extending axially and inwardly from the distal end 50 terminating at the middle of the link member 30. A mounting opening 52 is defined in each link member 30 adjacent to the distal end 50 to receive a bolt 54 therethrough to detachably connect an annular radial support wall 56. The annular radial support wall 56 is secured to the frame of the vehicle for supporting the brake assembly 20.

An annular rotor disk 58 is co-axially mounted to the wheel 22 and axially movable with respect to the wheel 22 which is well known and described with details in the Applicant's PCT application PCT/CA97/01014, and will not be further described in this application. The rotor disk 58 has the first radial planar annular friction surface 60 and a second radial planar annular friction surface 62 at the opposed sides respectively, and perpendicular to the wheel axis.

A first annular brake shoe 64 includes an annular axial section 66 and an annular radial section 68 extending outwardly from the axial section 66. The axial section 66 includes a plurality of notches 70 (only one shown), on the external periphery, spaced apart from one another (not shown). Each notch 70 has a recess 72 to receive a damping pad 74 attached on the bottom of the notch. Therefore, the first annular brake shoe 64 is radially supported by the annular radial wall 26 when the axial section 66 is placed within the inner edge 38 of the annular radial wall 26 while the radially protruding members 40 of the annular radial wall 26 extend into the respective notches 70 to contact the damping pads 74. The damping pads 74 are made of a resilient and deformable material adequate for absorbing vibration energy.

The first brake shoe 64 has an annular planar surface 76 adjacent to the first radial planar annular friction surface 60 of the rotor disk 58. The annular brake pad 78 is provided and attached to the annular planar surface 76 through a layer of resilient and deformable material 77, and slightly spaced apart from the first radial planar annular friction surface 60 of the rotor disk 58.

A second annular brake shoe 80 includes an external axial section 82, an internal axial section 84 and a radial section 86. The radial section 86 has an annular planar surface 88 adjacent and parallel to the second radial planar annular friction surface 62 of the rotor disk 58. A brake pad 90 is provided and attached through a layer of resilient and deformable material 87 to the radial planar surface 88, and slightly spaced apart from the second radial planar annular friction surface 62 of the rotor disk 58. A plurality of keys 92 (only one shown) are provided at the periphery of the external axial section 82 and circumferentially spaced apart from one another (not shown). The keys 92 are slidably received in the respective grooves 48 to permit the second annular brake shoe 80 axially movable with respect to the brake housing 24 and restrain the second annular brake shoe 80 from rotation. The second annular brake shoe 80 is radially supported to the radial support wall 56 using an annular rolling seal 94 which is received in an annular recess of the radial support wall 56 and tightly surrounds the inner axial section 84 of the second annular brake shoe 80.

An annular flexible bladder assembly 96 is attached to the radial support wall 56. When fluid such as oil is fed into the bladder assembly 96 it will expand, pressing against an annular piston member 98, and moving thus the second annular brake shoe 80 axially towards the friction surface 62 of the rotor disk 58.

The annular piston member 98 has a hollow structure defining an inner annular space 95 within the annular piston member 98, and protruding axially from the radial section 86. A plurality of bores 97 are provided, extending through the annular piston member 98 to communicate with the inner annular space 95 and outside of the annular piston member 98 in order to allow the circulation of air and enabling the dissipation of heat. The annular piston member 98 is secured through a layer of resilient and deformable material 99 to the radial section 86 of the second brake shoe 80. A thermal insulator 100 is disposed between the layer of resilient and deformable material 99 and the annular piston member 98.

The rotor disk 58 will also slide axially, in response to the force exerted by the bladder assembly 96, and the radial friction surfaces 60 and 62 will come in frictional contact with the brake pads 78 as well as brake pad 90. Thus, when it is necessary to apply the brakes, the bladder assembly 96 is expanded. However, to release the brakes, the oil is allowed to drain from the bladder assembly 96, thereby releasing the axial force on the second annular brake shoe 80, allowing the energy stored in rolling seal 94 to retract the brake shoe 80 and thus permit disk rotor 58 to rotate freely within the housing 24.

As described in the Applicant's PCT application PCT/CA97/01014, the rolling seal 94 is made from resilient and deformable material and is pre-compressed when inserted between the annular recesses of the radial support wall 56 and the inner axial section 84 of the second annular brake shoe. Thus, the annular rolling seal 94 serves not only as a vibration damping mechanism for the second brake shoe 80 but also produces an axial return force to move the second brake shoe away from the rotor disk 58 when the axial force applied by the bladder assembly is released. The rolling seal 94 will be deformed in the direction of the path of the brake shoe 80 when the second annular brake shoe 80 axially moves toward the rotor disk 58, and the rolling seal will be restored by the energy stored therein and will return to the shape before the brake shoe 80 axially moves towards the rotor disk 58, thereby moving the brake shoe 80 away from the rotor disk 58. Similar structures are used between the rotor disk 58 and its wheel support structure to move the rotor disk 58 away from the first annular brake shoe 64, which is not described here.

During the braking action, the respective frictional engagement between the rotor disk 58 and the first brake shoe 64, and between the rotor disk 58 and the second brake shoe 80 will have a tendency to rotate the first and the second brake shoes together with the rotor disk 58. However, as described above, the keys 92 on the periphery of the external axial section 82 of the second brake shoe 80 will restrain the second brake shoe 80 from rotating together with the rotor disk 58. The first brake shoe 64 is restrained from rotating together with the rotor disk 58 by the radially protruding members 40 on the inner edge 38 of the annular radial wall 26 of the housing 30. The radially protruding members 40 extend into the respective notches 70 in the axial section 66 of the first brake shoe 64 to restrain the rotation of the first brake shoe with respect to the housing 24.

During a braking action, the first brake shoe 64 is under an axial force applied by the bladder assembly 96 through the second brake shoe 80 and the rotor disk 58, and abuts the annular ridge 34 on the annular radial wall 26. The annular ridge 34 contacts a middle point of the radial section 68 of the first brake shoe 64, and the contacting surface of the annular ridge 34 is smoothly curved so that uneven and variable forces, which might result from uneven wearing, imperfect machining or other defects of the disk rotor and are applied to the radial section 68 of the first brake shoe 64, will force the local portions of the first annular brake shoe 64 to oscillate about the ridge 34, resulting in corresponding local portions of the axial section 66 to vibrate radially.

The radial vibration of the local portions of the axial section 66 of the first brake shoe 64 will have the resilient and deformable damping pads 74 periodically compressed between the annular surface 42 of the radially protruding members 40 and the axial section 66 so that the vibration energy of the first brake shoe is damped by the damping pads 74, and will not be transferred to the housing 24, or to other structures of the vehicle. Local portions of the layer of resilient and deformable material 77 are also periodically deformed in response to the uneven and variable forces applied to the brake pads 76, therefore to help in absorption of vibration energy.

During the braking action, the second brake shoe 80 is under the axial force applied by the bladder assembly 96 through the annular piston member 98 against the rotor disk 58. The uneven and variable forces resulting from uneven wear, imperfect machining or other defects of the disk rotor will force dynamical deformation of the local portions of the layer of resilient and deformable material 87, and the thin deformable radial section 86 of the second brake shoe 80 to absorb a portion of the vibration energy. The resilient rolling seal 94 helps in further absorption of the vibration energy. The dynamic deformation of local portions of the layer of resilient and deformable material 87 and the thin deformable radial section 86 of the second brake shoe 80 also help to reduce the high local pressure which occurs at the protruding spots on the second radial planar annular friction surface 62 of the rotor disk 58 during brake actions. The local high temperature resulting from the local high pressure, therefore is reduced and the crystallization of those protruding spots are avoided. Thus, premature wear of the break pad 90 is minimized. Similarly, the layer of resilient and deformable material 77 disposed between the brake pad 78 and the radial section 68 of the first brake shoe 64 contributes the same advantage to minimize the premature wearing-out of the brake pad 78.

The frictional movement between the second radial planar annular friction surface 62 of the rotor disk 58 and the second brake pad 90 produces heat energy which makes the radial section 86 of the second brake shoe 80 thermally and radially expanded. The thermal insulator 100 and the annular space 95 within the annular piston member 98 are advantageous to inhibit heat from transferring from the second brake shoe 80 to bladder assembly 96. The bores 97 allow air to enter and exit from the annular piston member 98, which will further cool the annular piston member 98. However, the thermally expanded radial section 86 of the second brake shoe 80 has a tendency to change the radial position of the annular piston member 98 which is attached thereto even though the annular piston member 98 itself is not thermally and radially expanded. The layer of resilient and deformable material 99 permits a relative radial displacement between the radial section 86 of the second brake shoe 80 and the annular piston member 98 so that the annular piston member 98 is adapted to maintain its original radial position with respect to the annular flexible bladder assembly 96 when the second brake shoe 80 is thermally expanded during brake actions. Thus, the flexible bladder avoids radial deformation and unnecessary stresses resulting therefrom.

It is noted that the improvements of the second brake shoe according to the embodiment may be changed and modified without departing from the spirit and principle of the invention. For example, the annular second brake pad 90 may be replaced by a plurality of brake pads circumferentially spaced apart to perform a similar function. It is also noted that the improvements on the second brake shoe according to the present invention may be incorporated into a disk brake assembly which has different structures from the disk brake assembly described above but works in a similar principle as the disk brake assembly described in this application. For example, the various embodiments of disk brake assemblies described in the Applicant's PCT application of PCT/CA97/01014 and the Applicant's co-pending Canadian patent application 2,314,547 readily incorporate the present invention. The embodiment described in this application is exemplary and not intended to limit the spirit and the scope of the invention which are intended to be limited only by the scope of the appended claims.

I claim:

1. A brake shoe for a disk brake assembly for a vehicle wheel on a vehicle wherein the disk brake assembly includes a housing having an annular radial wall mounted to the vehicle, an annular rotor disk within the housing and co-axially mounted to the wheel, and an annular expandable bladder attached to the annular radial wall of the housing, the brake shoe comprising:
   a) a radial section parallel to the rotor disk;
   b) means associated with the housing for radially supporting the brake shoe within the housing;
   c) means associated with the housing for preventing the brake shoe from rotation so that upon expansion of the bladder during a brake action, the brake shoe moves towards the rotor disk resulting in frictional engagement between the rotor disk and the radial section of the brake shoe; and
   d) the radial section being made from a thin resilient metal material whereby during the brake action the brake shoe is deformable under uneven and variable forces resulting from imperfect machining or uneven wearing of the rotor disk.

2. A brake shoe as claimed in claim 1 wherein the radial section of the brake shoe comprises an annular brake pad for frictional engagement with the rotor disk, and a layer of resilient and deformable material disposed between the annular brake pad and a radial annular surface of the annular radial section to secure the annular brake pad to the radial section.

3. A brake shoe as claimed in claim 1 wherein the radial section of the brake shoe comprises a plurality of brake pads circumferentially spaced apart for frictional engagement with the rotor disk, and a layer of resilient and deformable material disposed between the respective brake pads and a radial annular surface of the annular radial section to secure the respective brake pads to the radial section.

4. A brake shoe as claim 1 wherein the radial section comprises an annular piston member protruding axially therefrom for being pressed by the annular expandable bladder, and a layer of resilient and deformable material disposed between the annular piston member and the radial section to secure the annular piston member to the radial section, permitting a radial displacement therebetween so that the annular piston member is adapted to maintain an original radial position with respect to the annular expandable bladder regardless of radial thermal expansion of the annular rotor disk.

5. A brake shoe as claim 4 wherein the radial section comprises a thermal insulator disposed between the layer of resilient and deformable material and the annular piston member to inhibit heat transferring from the radial section to the piston member.

6. A brake shoe as claimed in claim 4 wherein the annular piston member comprises a hollow structure defining an inner annular space within the annular piston member.

7. A brake shoe as claimed in claim 6 wherein the annular piston member comprises a plurality of bores extending therethrough to communicate with the inner annular space and outside of the annular piston member.

8. A brake shoe as claimed in claim 1 further comprising an annular external axial section and an annular internal axial section, radially spaced apart and interconnected by the radial section.

9. A brake shoe as claimed in claim 8 wherein the internal axial section is adapted to be radially supported to the annular radial wall of the housing through a resilient annular seal.

10. A brake shoe as claimed in claim 8 wherein the external axial section comprises a plurality of grooves extending axially on a periphery of the external axial section, adapted for slidable engagement with a plurality of keys attached to the housing to prevent the brake shoe from rotation with the rotor disk during the brake action.

11. A brake shoe for a disk brake assembly for a vehicle wheel on a vehicle wherein the disk brake assembly includes a housing having an annular radial wall mounted to the vehicle, an annular rotor disk within the housing and co-axially mounted to the wheel, and an annular expandable bladder attached to the annular radial wall of the housing, the brake shoe comprising:
   a) a radial section having an radial planar surface parallel to the rotor disk;
   b) means associated with the housing for radially supporting the brake shoe within the housing;

c) means associated with the housing for preventing the brake shoe from rotation;

d) an annular piston member protruding axially from the annular radial section for being pressed by the annular expandable bladder so that upon expansion of the bladder during a braking action, the brake shoe moves towards the rotor disk resulting in frictional engagement between the rotor disk and radial planer surface of the radial section of the brake shoe; and e) a layer of resilient and deformable material disposed between the annular piston member and the radial section to secure the annular piston member to the radial section, permitting a radial displacement therebetween whereby the annular piston member is adapted to maintain an original radial position with respect to the annular expandable bladder regardless of radial thermal expansion of the annular rotor disk.

12. A brake shoe as claimed in claim 11 wherein the radial section comprises a layer of thermal insulator disposed between the layer of resilient and deformable material and the annular piston member to inhibit heat transferring from the radial section to the piston member.

13. A brake shoe as claimed in claim 12 wherein the annular piston member comprises a hollow structure defining an inner annular space within the annular piston member.

14. A brake shoe as claimed in claim 13 wherein the annular piston member comprises a plurality of bores extending therethrough to communicate with the inner annular space and outside of the annular piston member.

15. A brake shoe as claimed in claim 11 wherein the radial section is made from a thin resilient metal material whereby during the braking action the brake shoe is deformable under uneven and variable forces resulting from imperfect machining or uneven wearing of the rotor disk.

16. A brake shoe as claimed in claim 15 wherein the radial section of the brake shoe comprises an annular brake pad for frictional engagement with the rotor disk, and a layer of resilient and deformable material disposed between the annular brake pad and the radial annular surface to bond the annular brake pad to the radial section.

17. A brake shoe as claimed in claim 15 wherein the radial section of the brake shoe comprises a plurality of brake pads circumferentially spaced apart for frictional engagement with the rotor disk, and a layer of resilient and deformable material disposed between the respective brake pads and the radial annular surface to bond the respective brake pads to the radial section.

18. A disk brake assembly for a vehicle wheel on a vehicle wherein the disk brake assembly includes a housing having an annular radial wall mounted to the vehicle, an annular rotor disk within the housing and co-axially mounted to the wheel, a brake shoe, means associated with the housing for radially supporting the brake shoe within the housing, means associated with the housing for preventing the brake shoe from rotation, and an annular expandable bladder attached to the annular radial wall of the housing, upon expansion of the bladder during a brake action, the brake shoe being adapted to move towards the rotor disk resulting in frictional engagement between the rotor disk and the brake shoe; the brake shoe comprising:

a) a radial section having an radial planar surface parallel to the radial planar annular friction surface of the rotor disk;

b) an annular piston member protruding axially from the annular radial section for being pressed by the annular expandable bladder and c) a layer of resilient and deformable material disposed between the annular piston member and the radial section to secure the annular piston member to the radial section, permitting a radial displacement therebetween whereby the annular piston member is adapted to maintain an original radial position with respect to the annular expandable bladder regardless of radial thermal expansion of the annular rotor disk.

19. A disk brake assembly as claimed in claim 18 wherein the radial section is made from a thin resilient metal material whereby during the brake action the brake shoe is deformable under uneven and variable forces resulting from imperfect machining or uneven wearing of the rotor disk.

20. A disk brake assembly as claimed in claim 19 wherein the radial section of the brake shoe comprises an annular brake pad for frictional engagement with the rotor disk, and a layer of resilient and deformable material disposed between the annular brake pad and the radial annular surface to bond the annular brake pad to the radial section.

21. A disk brake assembly as claimed in claim 20 wherein the brake shoe further comprises an annular external axial section and an annular internal axial section, radially spaced apart and interconnected by the radial section.

22. A disk brake assembly as claimed in claim 21 wherein the internal axial section is radially supported to the annular radial wall of the housing through a resilient annular seal.

23. A disk brake assembly as claimed in claim 22 wherein the external axial section comprises a plurality of grooves extending axially on a periphery of the external axial section, slidably engaging a plurality of teeth attached to the housing to prevent the brake shoe from rotation with the rotor disk during the brake action.

24. A disk brake assembly as claimed in claim 18 wherein the radial section of the brake shoe comprises a layer of thermal insulator disposed between the layer of resilient and deformable material and the annular piston member to inhibit heat transferring from the radial section to the piston member.

25. A disk brake assembly as claim 24 wherein the annular piston member comprises a hollow structure defining an inner annular space within the annular piston member.

26. A disk brake assembly as claim 25 wherein the annular piston member comprises a plurality of bores extending therethrough to communicate with the inner annular space and outside of the annular piston member.

* * * * *